US007809882B1

(12) United States Patent
Liu et al.

(10) Patent No.: US 7,809,882 B1
(45) Date of Patent: Oct. 5, 2010

(54) SESSION INDEPENDENT BACKEND DATA CACHE SYSTEM

(75) Inventors: Tsehsin Jason Liu, Wellesley, MA (US); Julie Lin, Somerville, MA (US); Gopan Menon, Framingham, MA (US); Prakash Sridharan, Tamilnadu (IN)

(73) Assignee: Verizon Services Corp., Ashburn, VA (US)

( * ) Notice: Subject to any disclaimer, the term of this patent is extended or adjusted under 35 U.S.C. 154(b) by 409 days.

(21) Appl. No.: 11/337,568

(22) Filed: Jan. 24, 2006

(51) Int. Cl.
*G06F 12/00* (2006.01)
*G06F 13/00* (2006.01)

(52) U.S. Cl. .................. 711/113; 711/118; 707/752; 707/753; 707/754; 707/999.007

(58) Field of Classification Search .............. 711/118, 711/E12.019; 707/203, E17.12
See application file for complete search history.

(56) References Cited

U.S. PATENT DOCUMENTS

| | | | |
|---|---|---|---|
| 6,487,641 B1 * | 11/2002 | Cusson et al. ............... 711/144 |
| 6,539,382 B1 * | 3/2003 | Byrne et al. ................. 707/10 |
| 6,633,874 B1 | 10/2003 | Nusbickel | |
| 6,792,436 B1 | 9/2004 | Zhu et al. | |
| 6,836,774 B2 | 12/2004 | Melbin | |
| 6,877,066 B2 | 4/2005 | Benfield et al. | |
| 6,898,603 B1 | 5/2005 | Petculescu et al. | |
| 6,944,711 B2 | 9/2005 | Mogi et al. | |
| 6,950,823 B2 | 9/2005 | Amiri et al. | |
| 6,957,212 B2 | 10/2005 | Peng | |
| 7,191,170 B2 * | 3/2007 | Ganguly et al. ............... 707/2 |
| 7,333,982 B2 * | 2/2008 | Bakalash et al. .............. 707/5 |
| 2002/0004813 A1 * | 1/2002 | Agrawal et al. ............ 709/201 |
| 2007/0104326 A1 * | 5/2007 | Feigenbaum et al. ......... 380/44 |

\* cited by examiner

*Primary Examiner*—Mardochee Chery

(57) ABSTRACT

Data cache systems are provided that can be implemented on a backend server side, are session independent, support caching of large amounts of data while passing only the required amount of requested data through a network, and support pagination of data in an efficient manner. A backend data cache system may include a special database schema for caching data in a database server, a middleware program for providing application program interfaces to application programs making cache requests, and a cache maintenance program for maintaining cached data sets stored within the database server. Each cache request can be stored as a type of temporary table that is assigned a unique identifier, which can be used during different sessions and/or by different application programs to access cached data sets.

28 Claims, 5 Drawing Sheets

SESSION INDEPENDENT BACKEND DATA CACHE SYSTEM

BACKGROUND INFORMATION

Caching large amounts of data can help improve the overall performance of many computing systems. For instance, data caching is one approach that is often used to improve the performance of web-based systems. Web-based systems, such as large-scale enterprise level web portals, for example, typically integrate many backend systems that provide a variety of services to customers or clients via web servers. These services may utilize substantial amounts of data, such that the performance of these web-based systems may be improved with data caching.

Most existing software cache systems for web-based applications are usually implemented between clients and application servers, or at the client side. Such systems typically use either primary memory or storage devices for cache, and often suffer from one or more of the following disadvantages: 1) when application data sizes are very large, transferring data sets from servers to clients tends to slow the performance of the network, while clients usually only need to retrieve a portion of the overall data; 2) most web-based data caches are session dependent, meaning that each given data cache is typically user-dependent and generally cannot be reused after the user's session, and/or cannot be reused by different applications; 3) most existing systems do not support pagination (e.g., when a user wants to view only a portion of the data at a time) of large data sets in an efficient manner; and 4) existing cursor functionalities provided by most relational database technologies typically require application programs to hold connections to databases for the entire time a queried data set is needed, which can result in a considerable waste of resources during those periods of time when no operations occur in relation to such data sets.

Accordingly, there exists a need for improved software data cache systems that seek to overcome these and other problems in the industry.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION OF PREFERRED EMBODIMENTS

The preferred embodiments according to the present invention(s) now will be described more fully hereinafter with reference to the accompanying drawings, in which some, but not all embodiments of the invention(s) are shown. Indeed, the invention(s) may be embodied in many different forms and should not be construed as limited to the embodiments set forth herein; rather, these embodiments are provided so that this disclosure will satisfy applicable legal requirements. Like numbers refer to like elements throughout.

Figure 1:
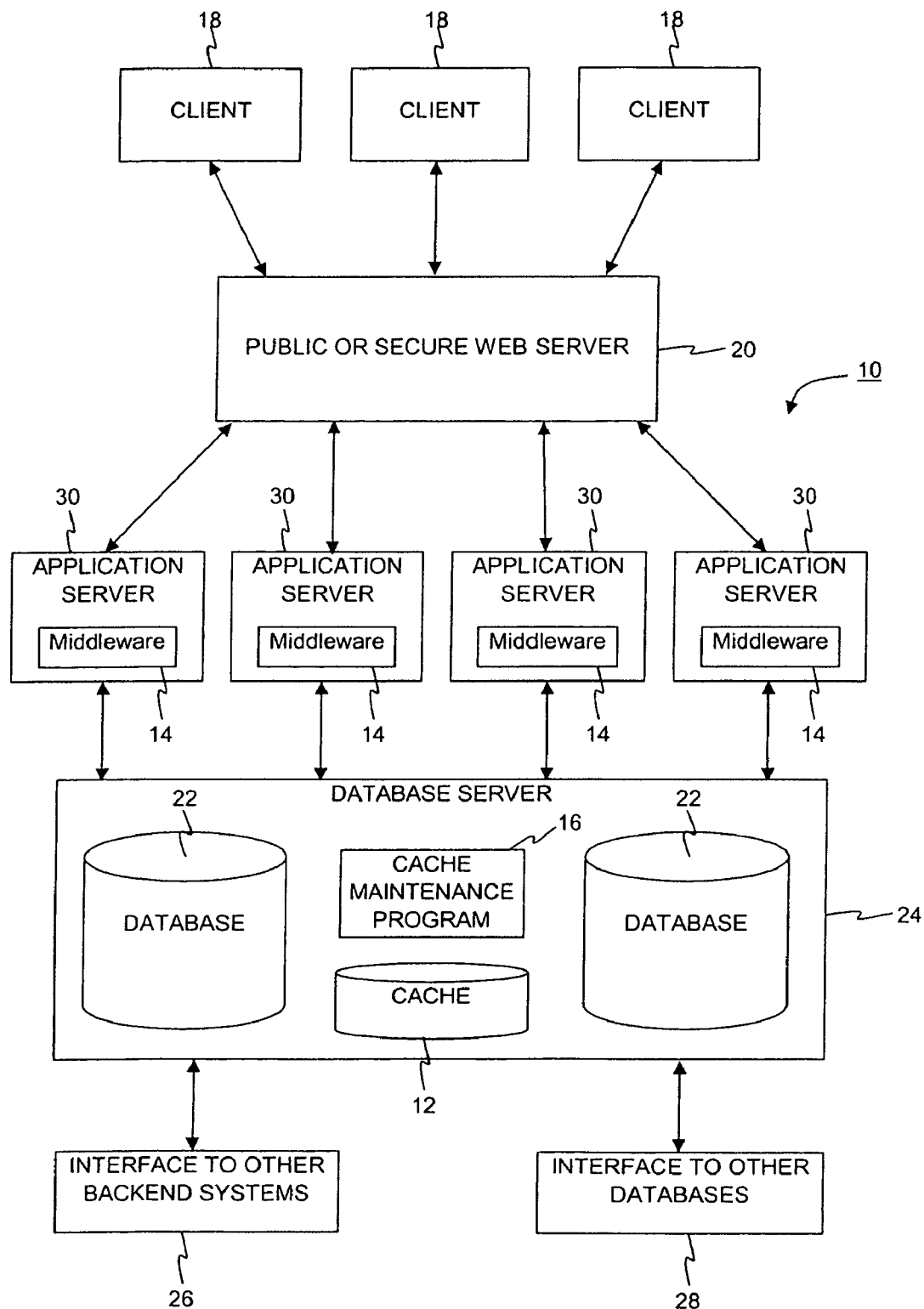
FIG. 1 shows a high-level block diagram of a typical environment in which a data cache system can be used in accordance with one embodiment of the present invention.

FIG. 1 shows a high-level block diagram of a typical networked environment in which a data cache system 10 can be used in accordance with one embodiment of the present invention. The environment shown may be, for example, a large-scale enterprise level web portal system that is used to provide services to customers via a public (or secure) web server 20. According to one embodiment, the data cache system 10 generally includes a specialized database schema or cache database 12 for storing cache requests; a middleware program 14 for providing application program interfaces (APIs) to application programs seeking to make cache requests; and a cache maintenance program 16 for maintaining the cached data sets that have been created inside the cache database 12. The operation and functionality associated with each of these components is described in detail below.

As suggested above, in one embodiment, the environment of FIG. 1 could be a large-scale enterprise level web portal system, or some other web- or networked-based system. In such case, a customer may wish to access one or more services provided via the portal. To do so, the customer can use a client device 18 to access a public (or secure) web server 20 via a private and/or public network, such as the Internet. The services provided by the enterprise level web portal may include, for example, a service that allows customers to view certain types of account information. In one embodiment, such information may be stored in a database 22 that is located on a database server 24, which is associated with the portal. As shown, the database server 24 may include an interface 26 to other backend systems and/or an interface 28 to other databases located on other database servers. In one embodiment, the database server 24 may be part of an overall database sub-system that includes several database servers that are arranged in a primary/back setting or clustering/grid environment.

To access a service associated with the portal, the customer usually triggers some type of application logic on the client device 18 (e.g., by using a web browser) that results in the generation of a request being sent from the client device to the web server 20 via a network. Upon receiving such request, the web server 20 typically directs the request to one or more application servers 30, which are configured to handle the request. As would be understood by one of ordinary skill in the art, application servers such as the ones shown in FIG. 1 are usually duplicated, and may include load balancing technologies to support large amounts of concurrent requests. After receiving the request, application programs on the application severs 30 can be used to process the request in an appropriate manner.

In one embodiment, when an application program on an application server 30 needs to cache a specific set of data, the application program calls the middleware program 14 which creates a cache of the data set in the cache database 12. The specific set of data may be defined by a SQL (Structured Query Language) statement that is generated in connection with the overall client request. As would be understood by one of ordinary skill in the art, SQL is a well known database sublanguage used in querying, updating, and managing relational databases. In such case, the middleware program 14 may create a cache of the requested data set by executing the SQL statement and copying all returned data into a temporary cache data table that is created in the cache database 12. After recording one or more parameters associated with the creation of the cached data set, such as a timestamp of when the cache was created, the middleware program returns the first "page" or portion of the data set (e.g., first ten records) to the application program, along with a unique identifier (ID) for identifying the cached data set during subsequent calls. In discussing various embodiments of the present invention, the unique identifier which can be used for identifying a particular cached data set during subsequent calls will sometimes be referred to herein as a "cursor ID."

When the application program needs to retrieve a second page of data, or jump to any other page of data included in the cached data set, the application program again calls the middleware program 14 with the given unique identifier (along with any other parameters that may be needed to specify which portion (or page) of data is being requested). Upon receiving this subsequent request, the middleware program 14 checks to see whether the cached data set identified by the unique identifier still exists in the cache database 12. If yes, the middleware program 14 obtains the appropriate page of data from the cache database 12 and returns such portion to the application program. If, however, the cached data set does not still exist in the cache database 12, the middleware program 14 may proceed to recreate a cache of the data set, typically in the same manner as the cache was originally created, and return the appropriate page to the application program. According to one embodiment, the cache maintenance program 16 is the module that is responsible for determining whether or not a given cached data set should be dropped from the cache database 12 at a given time. Operation of the cache maintenance program 16 will be described in further detail below.

Figure 2:
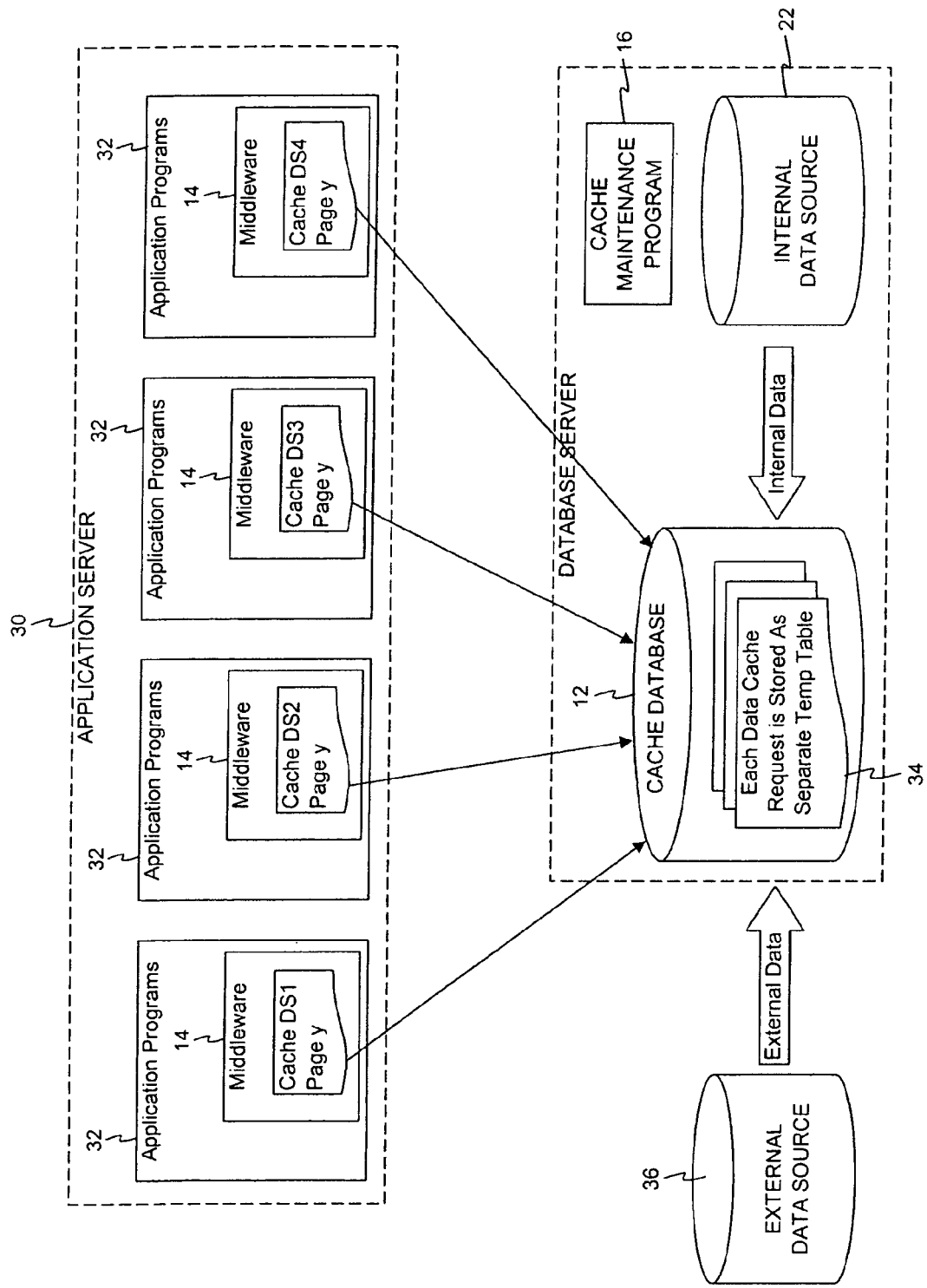
FIG. 2 shows an overview of the data flow between different components of the data cache system of FIG. 1 in accordance with one embodiment of the present invention.

FIG. 2 shows an overview of the data flow between different components of the data cache system 10 of FIG. 1 in accordance with one embodiment of the present invention. When an application program 32 on an application server 30 needs to cache a specific set of data, the application program calls the middleware program 14 with a request to cache the data. In various embodiments, the decision of whether or not to cache a specific set of data can depend on a variety of factors. For example, caching is typically recommended when the size of the overall data set is very large, and the user does not need to see all of the data at a given time. In other words, if the size of the data set is very large (e.g., fifty thousand records), and the user only wants to view a page of data (e.g., ten records) at a time, then caching some or all of the data in the cache database 12 can help improve network data transfer performance by passing only a single page of data to the user at a given time. Caching may also be recommended when data retrieval through backend systems is very expensive in terms of time or resources, for example. Instead of waiting for the complete data retrieval process to finish, caching the data in the cache database 12 typically allows the user to see the first page of data quicker. Thus, in these and other such cases, the application program 32 can call the middleware program 14 with a request to cache the data.

In response to receiving such a request, the middleware program 14 creates a cache 34 of the data in the cache database 12. More specifically, in one embodiment, the middleware program 14 creates a cache of the requested data set by executing a SQL statement generated in response to information in the request, and copies all returned data into a temporary cache data table 34 that is created in the cache database 12. The data source(s) from which each cached data set 34 originates may include both "internal" data sources, such as a database 22 on the same database server 24 as the cache database 12, and "external" data sources 36, which can include storage areas on other backend systems or databases on other database servers, for example. Each cached data set 34 is typically assigned a unique identifier for identifying that data set during subsequent calls.

In the example of FIG. 2, four different application programs 32 are depicted as making four separate calls in connection with four separate cache requests, which are identified as Cache DS1 (Cache Data Set 1), Cache DS2 (Cache Data Set 2), Cache DS3 (Cache Data Set 3), and Cache DS4 (Cache Data Set 4). Each of these calls to the middleware program 14 may be either an initial cache request, which typically results in a new cached data set 34 being created in the cache database 12, or a subsequent call to an existing cache request. Subsequent calls typically involve accessing an existing cached data set 34 by using the unique identifier that was previously assigned to such data set by the middleware program 14. Once created, the unique identifier assigned to a given cached data set 34 can be used by different application programs and/or during different user sessions to retrieve data from an existing or previously cached data set. In other words, by using the unique identifier associated with an existing cached data set 34, an application program 32 can request that the middleware program 14 retrieve a specific portion (e.g., page y) of the cached data set. Upon receiving the requested portion or page of the cached data set 34, application programs can process the data as needed and/or return results to clients. Such application programs can also store and/or pass the unique identifier to other application programs for additional operations.

It should be noted that the application program(s) 32 and middleware program(s) 14 need not be located on the same server or machine, as depicted in FIGS. 1-2. Instead, either of these modules can be configured to operate at or from any point within a networked environment. For example, an application program calling the middleware program 14 may be an application program 32 running on an application server 30, as shown in FIG. 2, or it may be an application program running on a client device 18. In still other embodiments, the middleware program 14 and/or application programs 32 may be configured to operate in a distributed fashion across multiple servers or machines.

The cache maintenance program 16 is generally responsible for maintaining the cache database 12 by cleaning out expired or outdated cache requests so that new cache requests can reuse the resources. In one embodiment, the cache maintenance program 16 exists inside the same database server 24 as the cache database 12, and executes substantially independently of other programs associated with the data cache system 10. Various mechanisms can be used to maintain the cache database 12.

For example, in one embodiment, the cache maintenance program 16 can be configured to implement what is referred to as a "fixed lifecycle with extension" approach to maintaining the cache database 12. In this approach, a stored procedure can be periodically triggered to clean out or delete all cached data sets 34 that have not been called by an application program 32 for longer than an allotted period of time (e.g., 15 minutes). In other words, the "lifecycle" timer associated with each cached data set 34 is essentially extended or reset each time an application program makes a call in connection with that cached data set. Thus, as long as one or more application programs continue to make subsequent calls to a given cached data set before it expires, the cached data set could be maintained in the cache database 12 indefinitely (or at least until a predetermined maximum time limit is reached, at which point the data may be deemed stale). On the other hand, if no calls are made to a given cached data set 34 for a period of time that exceeds the data set's allotted "lifecycle" (e.g., 15 minutes), the cache maintenance program 16 will remove the cached data set from the cache database 12 during the next cleaning operation.

In another embodiment, the cache maintenance program 16 can be configured to implement what is referred to as a "fixed total storage space" approach to maintaining the cache database 12. In this approach, each cached data set 34 is kept as long as there is space for new cache requests. However, when there is not enough space in the cache database 12 to accommodate a new cache request, the oldest cache will be removed to clean up space; if there is still not enough space, the next oldest cache will be removed, and so on until enough space is allocated to accommodate the new cache request. According to one embodiment, the age of each cached data set is measured from the time when it was last accessed by an application program, though, in other embodiments, the age of each cached data set can be based at least in part on the time when it was initially created.

In yet another embodiment, the cache maintenance program 16 can be configured to implement a combination of the above two approaches: Specifically, when there is not enough storage space in the cache database 12 to satisfy all cache requests, the "fixed total storage space" approach can be applied; otherwise the "fixed lifecycle with extension" approach will be in use. In other words, all outdated or expired cached data sets will be periodically removed in accordance with the "fixed lifecycle with extension" technique described above, but when space is needed, even non-expired cache requests (if they are the "oldest") may be removed when there is a need to make room for a new cache request.

Figure 3:
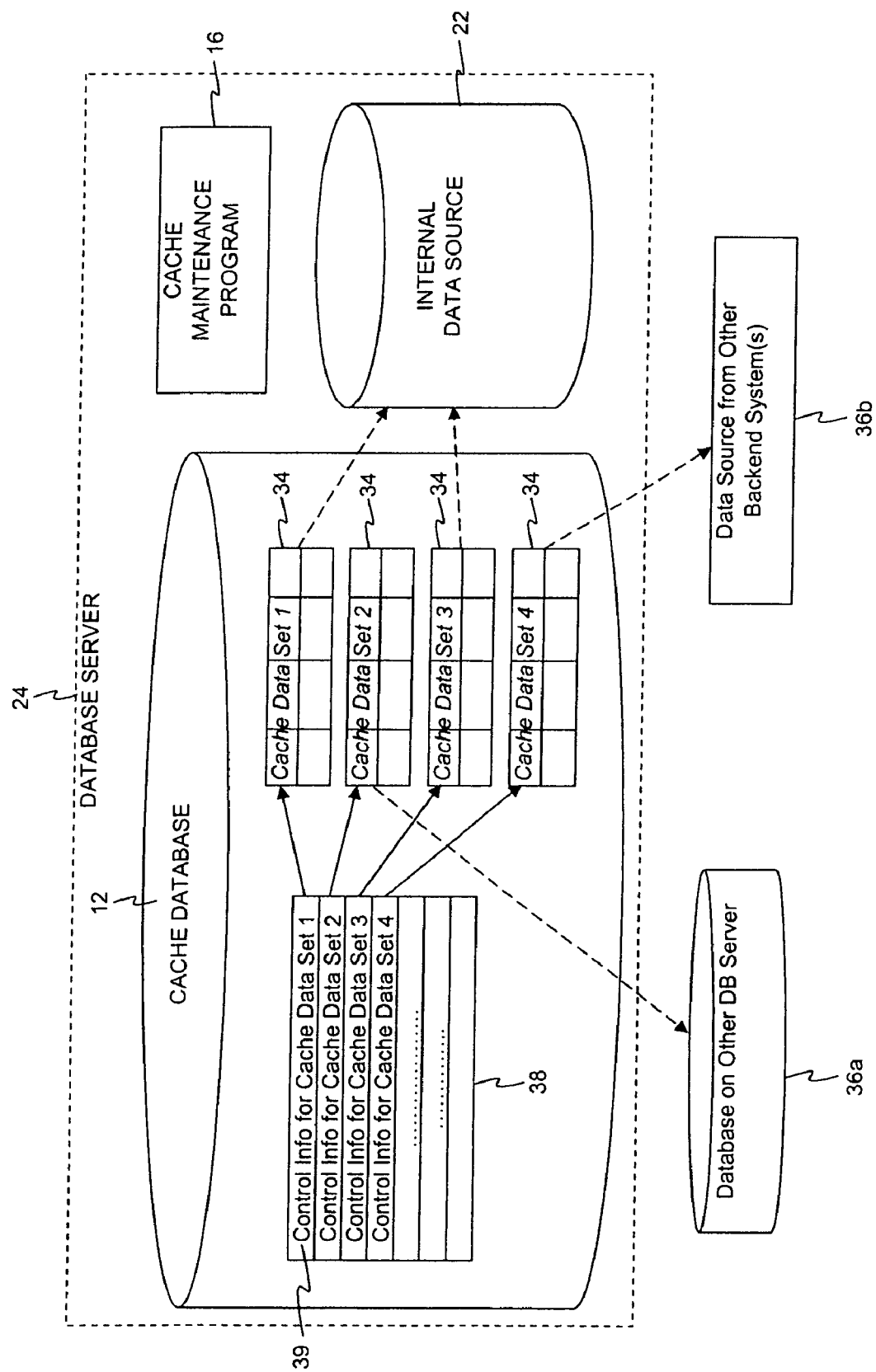
FIG. 3 shows the relationships between different components of the cache database of FIG. 2 in accordance with one embodiment of the present invention.

FIG. 3 illustrates the relationships between different components of the cache database 12 of FIG. 2, in accordance with one embodiment of the present invention. Specifically, in this embodiment, the cache database 12 is implemented as a specially configured relational database. This specialized database (or schema) 12 generally includes a cache control information table 38 and one or more temporary cache data tables 34 that contain the actual cached data sets.

Each cache request has a unique record 39 in the cache control information table 38, which typically includes a number of parameters or fields that will be described below. In one embodiment, each record 39 in the cache control information table 38 may or may not link to an actual cache data table 34, which stores the data set associated with that cache request. The ability to create or not create an actual cache data table 34 in association with a given cache request is sometimes referred to herein as a "virtual cache" function. The virtual cache function allows a cache request to be implemented by adding only cache control information data to the cache control information table 38 without actually creating a corresponding cache data table 34. This feature is typically used when the data retrieval speed (from either internal data sources or external data sources) of a particular cache request is known to be fast and reliable, and the data set itself will not change quickly. This may depend, for example, on a set of system-related performance parameters that are known to be present in a particular system at a given time. Operation of the virtual cache function is mainly handled by the middleware program 14, which, in one embodiment, revises the original SQL statement on each call to retrieve only the specified portion of data from the actual data source (i.e., rather than from a cache data table 34).

The data sources associated with different cache requests may include data sources on the same database server 24 as the cache database 12 (e.g., internal data source 22), other databases on other database servers 36a, or storage devices on other backend systems 36b, for example. When a cached data set is generated through a SQL statement, the data types of the actual cached data set stored in a given cache data table 34 are typically specified by the SQL statement, which is generated by the middleware program 14 in response to the request received from the application program. However, when the source of the requested data is not a database (e.g., a file stored in a directory of a backend system 36b), the actual data of the cached data set 34 can be stored in the cache database 12 in the same uniform text format that the data was stored in when it was retrieved from the original data source.

As noted above, each cache request has a unique record 39 in the cache control information table 38 that typically includes a number of parameters or data fields. In one embodiment, each unique cache control information record 39 in the cache control information table 38 may include some or all of the following fields: a "unique cursor ID" or other identifier that uniquely identifies the particular cache request; an "original request timestamp" for identifying when the cache request was initially created; an "expire timestamp," which can be extended when requested (e.g., based on frequency of use of the particular cached data set); an SQL statement that identifies or defines the actual data set associated with the cache request; a "virtual cache flag" for indicating whether an actual cache data table 34 has been created in association with the particular cache request; a "count of total records" field for identifying the total number of records produced by executing the SQL statement; and a "current cursor position" field that points to the current record in the cached data set.

Each record 39 in the cache control information table 38 may also include a "current page position" field, which identifies the current page (or portion) of data being pointed to in the cached data set. The current page number is typically a function of how many records an application program (or user) is requesting to be retrieved at a given time. Thus, if the application program or user is requesting that ten records be retrieved at a time from the total number of records in the data set, the first "page" of data will be defined as the first ten records, the second "page" of data as the next ten records, and so on. Each cache control information record 39 may also include a field for identifying the source of the data (e.g., internal data source 22 or external database 36a); a field for identifying the owner of the cache, which is typically the entity or system that initially created the cache; and a "shareable flag" that indicates whether this cache can be shared with other users and/or other application programs.

Each cache control information record 39 may further include a "full or partial data flag" for indicating whether or not the full data set produced by executing the SQL statement was loaded into the cache database 12. This may occur, for example, when the requested cache size exceeds system constraints that are placed on the amount of data that can be cached in association with a given cache request. In one embodiment, if this occurs, the middleware program 14 will cache only the system-allowed maximum cache size (e.g., 5000 records) at a time, and the rest of the data will be cached only when application programs need to access data within the range that is not currently cached. In connection with operation of this feature, each cache control information record 39 may further include a "partial loaded data starting page number" field and a "partial loaded data ending page number" field for describing in page numbers the portion of the overall data set that is currently cached in the cache database 12.

In one embodiment, to improve storage speed, normal database logging as performed in most database systems can be turned off with regard to the data storage tables 34, and turned on with regard to the cache control information table 38. As such, when a disaster happens, the system can recover the cache control information table 38, which in turn already contains any information that may be needed to recreate each of the cache data tables 34.

Figure 4:
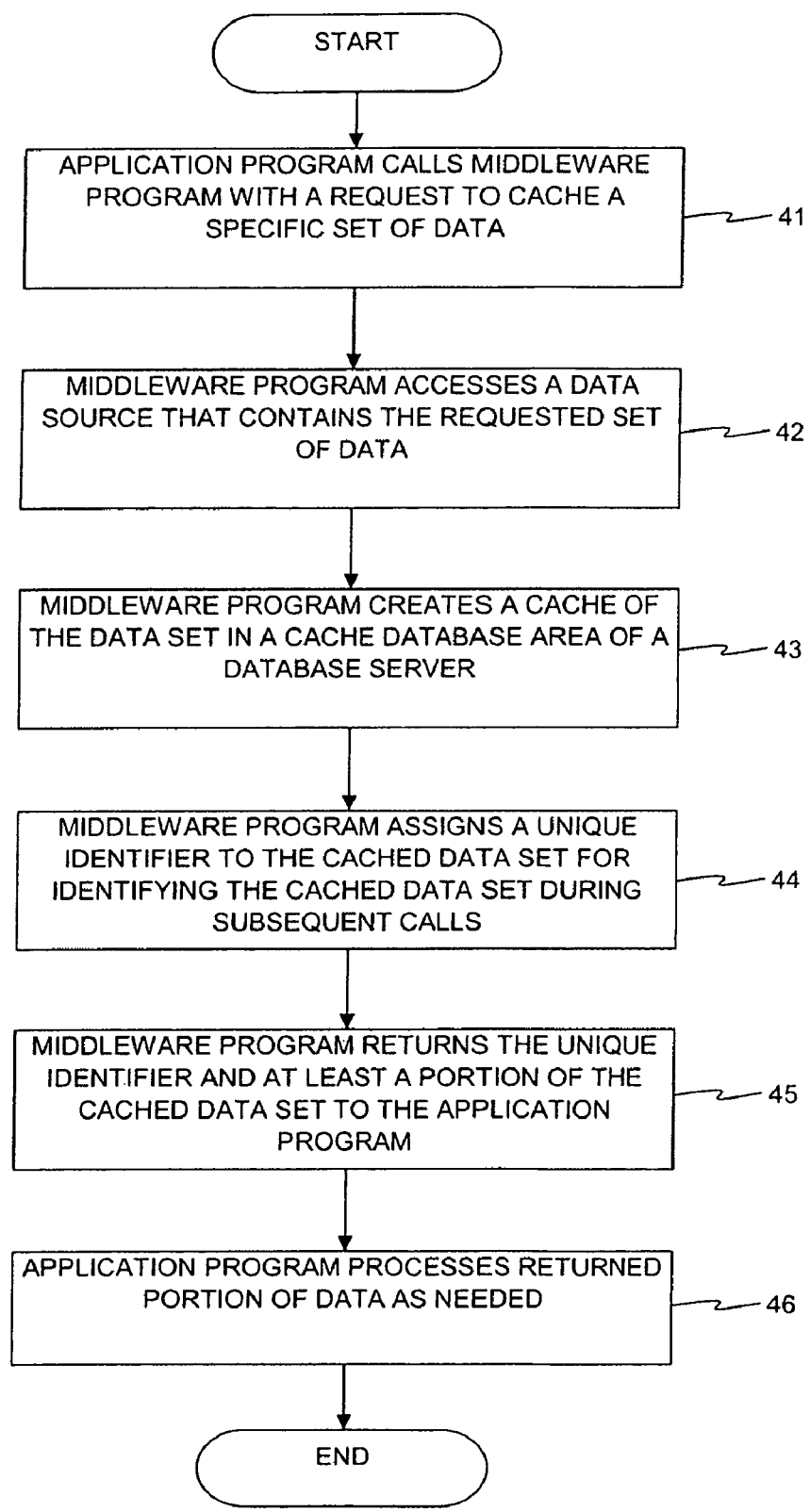
FIG. 4 shows a flow chart illustrating a sequence of steps for performing an initial cache request in accordance with one embodiment of the present invention.

FIG. 4 shows a flow chart illustrating a sequence of steps for performing an initial cache request in accordance with one embodiment of the present invention. When an application program 32 needs to cache a specific set of data (e.g., in response to a user request received at an application server 30 via a web server 20), the application program (at Step 41) calls the middleware program 14 with a request to cache the data set. In response to receiving such a request, the middleware program, at Step 42, proceeds to access a data source that is known to contain the requested set of data. The data source containing the requested set of data may include a database 22 that resides on the same database server 24 as the cache database 12, a database 36a that resides on a different database server than the cache database, and/or a storage device 36b on another backend system, for example. In one embodiment, the middleware program 14 generates an appropriate query of the data source by translating the information received in the cache request into a SQL statement that can be used to retrieve the data from a database, such as database 22 or database 36a. In another embodiment, the step of accessing the data source containing the requested set of data may include generating an appropriate set of instructions for accessing a data file stored in a directory of a backend system, for example.

At Step 43, the middleware program creates a cache of the data set in the cache database 12 of the database server 24. This may include, for example, executing the SQL statement generated in the previous step, and copying all returned data into a temporary cache data table 34 that is created in the cache database 12 of the database server 24. According to one embodiment, the creation of a new cache request also includes the step of adding cache control information data to a unique record 39 that is created in the cache control information table 38. In addition to one or more of the types of parameters described above, the unique record 39 typically includes a unique identifier (or "cursor ID") that the middleware program 14 assigns to the cached data at Step 44. Once created, this unique identifier can be used by application programs to identify the particular cached data set during subsequent calls. As such, a particular cached data set can be subsequently accessed (after its initial creation) during the same or different user sessions, and/or by the same or different application programs (as long as such applications are provided with the unique identifier that identifies the cached data set).

To facilitate the capability of making subsequent calls to the newly created cached data set, the middleware program, at Step 45, returns the unique identifier to the application program, along with a requested portion of the cached data set. After receiving such data from the middleware program, the application program, at Step 46, processes the data as needed. This may include, for example, returning results to a user and/or other application programs.

In one embodiment, the portion of data that is to be returned to the application program during a given call is defined by a set of parameters that are passed from the application program to the middleware program. For example, in one embodiment, such parameters may include, but are not limited to, a "position" field and an "amount" field. In such case, the value of the "position" field identifies the starting point for retrieving a requested portion of the overall data set that is produced by executing the SQL statement associated with the cache request. The "position" field (or its equivalent) can be assigned a value of one on the first call (though it need not be), so that the starting "position" for retrieving data will be the first record in the overall data set. The "amount" field, on the other hand, can be used for specifying the amount of data (or page size) to be returned in a given call. For example, setting the "amount" field to ten means that each page of data retrieved by the middleware program in a given call will have ten records, starting with the record pointed to by the "position" field.

If the total size of the cache request exceeds a system-allowed maximum cache size, then, according to one embodiment, only a portion of the overall data set defined by the SQL statement (or other query information) will be loaded into the cache database 12. When this occurs, the rest of the data in the data set that was not loaded into the cache database 12 will typically be cached only when an application program needs to access data within that range. In this way, the system can limit the size of individual cache requests. However, according to yet another embodiment, an optional flag or data field can be set by the application program and/or the middleware program to override the system-allowed maximum cache size limitation in certain situations.

In still other situations, the middleware program 14 may decide to process a given cache request using the virtual cache function. The virtual cache function, in one embodiment, allows a cache request to be implemented by adding only cache control information data to the cache control information table 38 without actually creating a corresponding cache data table 34 in the cache database 12. This feature is typically used when the data retrieval speed (from either internal data sources or external data sources) of a particular cache request is known to be fast and reliable, and the data set itself will not change quickly. In the case of a virtual cache request (when no temporary cache data table 34 is created), the middleware program 14 typically revises the SQL statement (during the initial and each subsequent call) to retrieve only a specified portion (or page) of data from the actual data source 22, 36.

Figure 5:
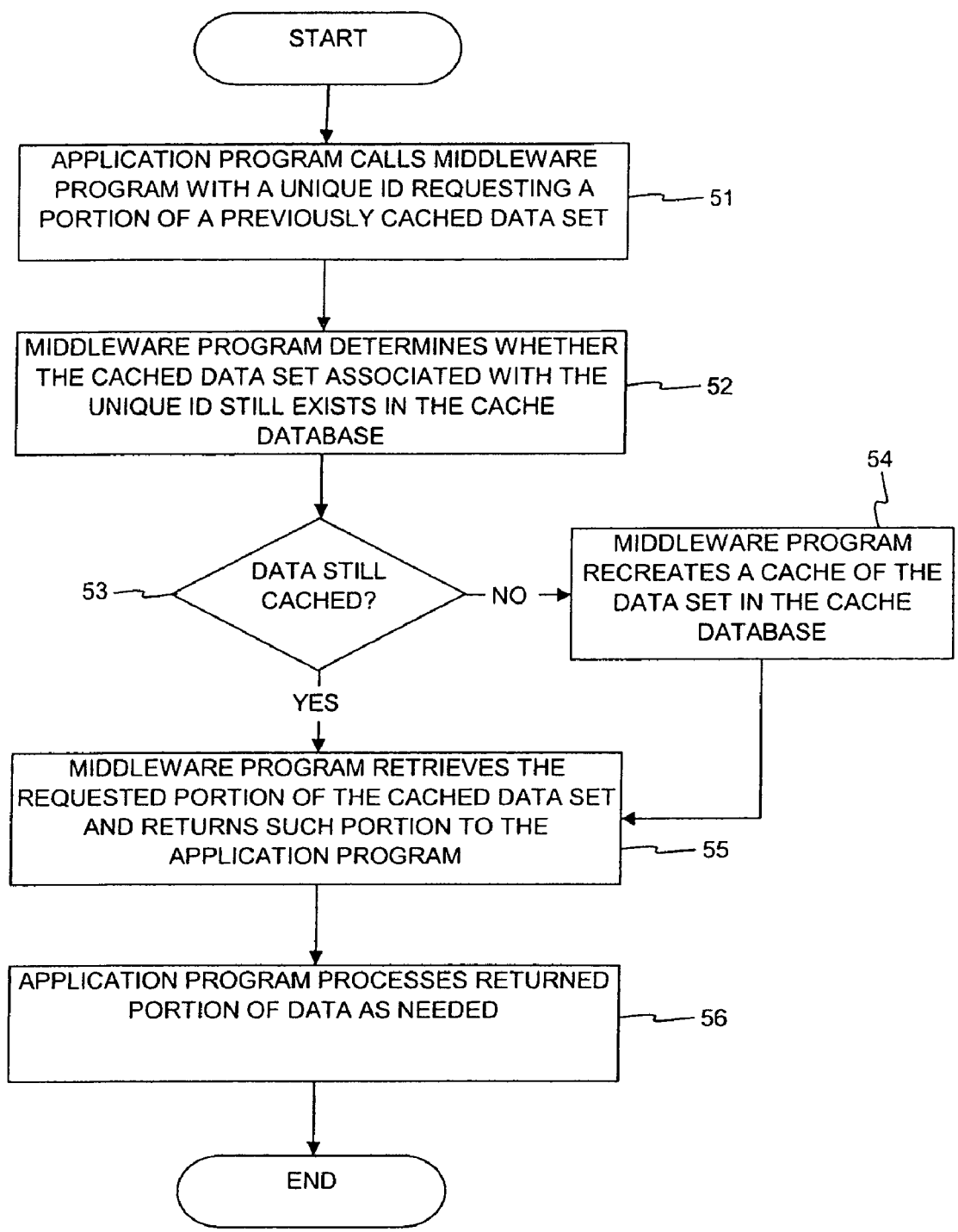
FIG. 5 shows a flow chart illustrating a sequence of steps for performing a subsequent call to a previously created cached data set in accordance with one embodiment of the present invention.

FIG. 5 shows a flow chart illustrating a sequence of steps for performing a subsequent call to a previously created cached data set, in accordance with one embodiment of the present invention. When an application program 32 needs to retrieve data from a previously created cached data set, the application program (at Step 51) calls the middleware program 14 with the unique identifier that identifies the particular cached data set. This may occur, for example, when the application program that initially created the cached data set needs to retrieve a second, next, or any other specified page of data from the already cached data set during a given session (e.g., when a user of a web-based system is paging through the results of a search query performed during a given user session, such as might occur in an enterprise level web-portal system). However, by using the unique identifier associated with a given cached data set, subsequent calls to previously created cached data sets can also be made by different application programs, and/or during different user sessions.

Upon receiving the request to retrieve data from an already cached data set, the middleware program 14 (at Step 52) checks to see whether the cached data set associated with the given unique identifier still exists in the cache database 12 of the database server 24. According to one embodiment, this is a function of whether the cache maintenance program 16 has already dropped or deleted the particular cached data set from the cache database 12.

The cache maintenance program 16 can be configured to maintain the cache database 12 by implementing one or more techniques for cleaning out certain cache requests (e.g., expired cache requests) so that new cache requests can reuse the resources of the cache database. Such techniques may include periodically removing all cached data sets from the cache database 12 that exceed a certain age, or removing the oldest one or more cached data sets from the cache database only when there is not enough room to accommodate a new cache request. In yet another embodiment, the cache database 12 can be maintained by removing previous cache requests from the cache database in accordance with a combination of both these techniques, meaning, for example, that all outdated or expired cached data sets will be periodically removed in accordance with the former technique, but even "non-expired" cache requests (if they are the "oldest" cache requests in the cache database) may be removed when there is a need to make room for a new cache request. According to one embodiment, the age of a given cached data set is measured from the time when it was last accessed by an application program, though, in other embodiments, the age of a cached data set may be measured from the time when it was initially created.

If (at Step 53) the middleware program determines that the cached data set still exists in the cache database 12, the middleware program proceeds to Step 55 where it retrieves the currently requested portion of the cached data set, and returns such portion to the application program 32. If the cached data set associated with the unique identifier was previously implemented by the middleware program as an "actual" cache request, meaning that a cache data table 34 containing the data set was actually created in the cache database 12, then the step of retrieving the currently requested portion of data typically involves retrieving such data from the appropriate cache data table 34. The appropriate cache data table 34 can be found by accessing the cache control information data in the cache control information table 38 that is associated with the given unique identifier. However, if the cache request was previously implemented as a "virtual" cache request, meaning that no corresponding cache data table 34 was created in the cache database 12, then the middleware program can retrieve the currently requested portion of data directly from the original data source (e.g., database 36a). In one embodiment, the middleware program accomplishes this by revising the original SQL that defines the overall data set (as stored by the cache control information table 38), to retrieve only the currently requested portion of data from the actual data source.

Alternatively, if (at Step 53) the middleware program 14 instead determines that the cached data set does not still exist in the cache database 12, meaning that the cache control information for the cached data set (virtual or actual) and the cached data (for actual only) do not still exist in the cache database, the middleware program proceeds to Step 54 where it carries out the process of recreating the cached data set in the cache database. As described above, this process typically includes adding cache control information data to a unique record 39 in the cache control information table 38. The process may also include creating a corresponding cache data table 34 of the requested data set in the cache database 12, depending on whether the middleware program 14 implements this particular cache request as a "virtual" cache request or an "actual" cache request. With the cached data set having been recreated in the cache database 12 (either as a virtual cache request or an actual cache request), the middleware program 14 again proceeds to Step 55 where it retrieves the currently requested portion of data in an appropriate manner, and returns such portion of data to the application program 32. After receiving the requested portion of data from the middleware program 14, the application program (at Step 56) can process the data as needed.

The portion of data that is to be returned to an application program 32 during a given call can be defined by a number of parameters, such as a "position" field that points to the first record to be retrieved in the current call, and an "amount" field that specifies the number of records to be retrieved from that point. In certain situations, application programs (e.g., in response to user requests) may also want to resort the data in already cached data sets during subsequent calls. Accordingly, in one embodiment, an optional field or data string specifying a set of sorting criteria can be passed to the middleware program 14. When such parameters are received, the middleware program will retrieve the data from the cache data table 34 in the cache database 12 and present it to the application program 32 in a format that is consistent with the specified sorting criteria. According to one embodiment, the physical record locations of the data in an already cached data table 34 will not change once the data is cached in the cache database 12. Instead, the middleware program 14 will retrieve the data from the cache data table 34 and perform the resorting prior to presenting the data to the application program.

Filtering of data in an already created cached data set can also be performed in much the same way as sorting. In other words, in one embodiment, an optional field or data string specifying a set of filtering criteria can be passed to the middleware program 14 during a subsequent call. The middleware program can then extract only that data from the cached data set that meets the specified set of filtering criteria. To support consistency with cache requests having real cache tables 34, the middleware program can also be configured to support sorting and/or filtering of data in the case of virtual cache requests. In one embodiment, this can be accomplished by making appropriate revisions to the original SQL statement on each such subsequent call. In other words, in the case of virtual cache requests, the middleware program 14 can make appropriate modifications to the original SQL statement to include the newly added sorting and/or filtering criteria that are specified in a subsequent call. By executing this modified SQL statement against the actual data source(s) associated with the cache request, the data will again be presented to the application program 32 in a format as requested.

A computer-readable medium may be employed in one or more embodiments. For example, a system for processing data in a network environment may include a middleware program embodied in a computer readable medium and providing an application program interface to application programs making cache requests in relation to specific sets of data, a cache database in a database server communicatively coupled to the middleware program and configured to cache the specific sets of data, wherein each cached set of data is assigned a unique identifier for identifying the cached set of data during subsequent calls, and a cache maintenance program embodied in a computer readable medium and communicatively coupled to the cache database, the cache maintenance program configured to maintain the cache database. As another example, a computer-readable medium may store instructions that, when presented to a processor, cause the processor to perform the steps of: receiving an initial request from a first application program to cache a specific set of data, accessing a data source that contains the requested set of data, creating a cache of the set of data in a cache database maintained on a database server, assigning a unique identifier to the cached set of data for identifying the cached set of data during subsequent calls, returning the unique identifier and at least a portion of the cached set of data to the application program making the initial request, and receiving a subsequent request from a second application program to retrieve a specified portion of the previously cached set of data, wherein the subsequent request comprises the unique identifier that identifies the cached set of data, determining whether the cached set of data still exists in the cache database maintained on the database server, recreating a cache of the set of data in the cache database if it is determined that the cached set of data does not still exist in the cache database, and returning the requested portion of the cached set of data to the second application program.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method of processing data in a networked environment, said method comprising:
   receiving a request from an application program to cache a specific set of data;
   accessing a data source that contains the requested set of data;
   creating a cache of the set of data in a cache database maintained on a database server, the cached set of data including a plurality of records;
   assigning a unique identifier to the cached set of data for identifying said cached set of data during subsequent calls;
   returning the unique identifier and a first portion of said cached set of data to the application program making said request;
   receiving a subsequent request from an application program to retrieve a second portion of said cached set of data, wherein said subsequent request comprises the unique identifier and a request to sort the plurality of records in the cached set of data;
   using the unique identifier in said subsequent request to identify said cached set of data;
   sorting the plurality of records in the cached set of data in accordance with the request to sort the plurality of records in the cached set of data to define the second portion of the cached set of data; and
   returning the second portion of said cached set of data to the application program making said subsequent request.

2. The method of claim 1, wherein creating a cache of the set of data in the cache database comprises:
   supplementing a cache control information table to include cache control information data associated with the cached set of data; and
   supplementing a cache data table to include the cached set of data associated with the cache control information data in said cache control information table.

3. The method of claim 2, wherein supplementing the cache control information table comprises at least one of: including a field that specifies a data type of the cached set of data in the cache control information data; including the unique identifier associated with the cached set of data in the cache control information data; and including a timestamp associated with the cached set of data in the cache control information data.

4. The method of claim 1, wherein said creating step comprises:
   adding cache control information data to a record created in a cache control information table;
   retrieving the requested set of data from said data source; and
   copying said set of data into a cache data table created in said cache database.

5. The method of claim 4, wherein said copying step comprises copying less than all of said set of data into said cache data table if the total size of said set of data exceeds a maximum cache size.

6. The method of claim 1, wherein said returning step comprises returning only a specified portion of said cached set of data based on information included in the request received from said application program.

7. The method of claim 1, further comprising removing an oldest one or more cached sets of data from said cache database when there is not enough storage space in the cache database to accommodate a new cache request.

8. The method of claim 1, further comprising generating a structured query language (SQL) statement to be used in retrieving the requested set of data from said data source.

9. The method of claim 1, wherein the data source containing said set of data comprises at least one of: a database on the same database server as the database server containing said cache database; a database on a different database server than the database server containing said cache database; and a storage device on a backend system.

10. The method of claim 1, further comprising:
    determining whether said cached set of data still exists in the cache database; and
    recreating a cache of said set of data in said cache database if it is determined that said cached set of data does not still exist in said cache database.

11. The method of claim 10, wherein the application program making said subsequent request is a different application program than the application program making said request for the cached set of data.

12. The method of claim 10, wherein said request is made during a first user session of a web-based system and said subsequent request is made during a second user session of said web-based system, said second user session being different from said first user session.

13. The method of claim 1, wherein said creating includes creating a cache copy of the set of data in a temporary table in the cache database maintained on the database server, and wherein the unique identifier is configured to identify the temporary table during the subsequent calls.

14. The method of claim 1, wherein the sorting of the plurality of records in the cached set of data does not change physical record locations of said plurality of records in the cached set of data.

15. A system for processing data in a networked environment, said system comprising:
    a middleware program embodied in a computer readable medium and providing an application program interface to application programs making cache requests in relation to specific sets of data; and
    a cache database in a database server communicatively coupled to the middleware program and configured to cache said specific sets of data; wherein, in response to a request from an application program to cache a specific set of data, said middleware program is configured to:

retrieve the requested set of data from a data source;
create a cache of the set of data in said cache database maintained on said database server, the cached set of data including a plurality of records;
assign a unique identifier to the cached set of data for identifying said cached set of data during subsequent calls;
return the unique identifier and a first portion of said cached set of data to the application program making said request; and
wherein, in response to a subsequent request from an application program to retrieve a second portion of said cached set of data, said subsequent request including said unique identifier and a request to sort the plurality of records in the cached set of data, said middleware program is configured to use said unique identifier included in said subsequent request to identify the cached set of data, sort the plurality of records in the cached set of data in accordance with the request to sort the plurality of records in the cached set of data to define the second portion of the cached set of data, and return said second portion of said cached set of data to said application program making said subsequent request.

16. The system of claim 15, wherein said cache database comprises:
a cache control information table storing cache control information data associated with said cache requests; and
a cache data table containing said specific sets of data associated with said cache requests associated with the cache control information data in said cache control information table.

17. The system of claim 16, wherein the cache control information table includes at least one of: a field specifying a data type each said cached set of data, the unique identifier for identifying each said cached set of data, and a timestamp associated with each of said cached requests.

18. The system of claim 16, wherein, in response to a request from an application program to cache a specific set of data, said middleware program is configured to:
add cache control information data to said cache control information table; and
copy said set of data into a cache data table created in said cache database.

19. The system of claim 18, wherein said middleware program is further configured to generate a structured query language (SQL) statement to be used in retrieving said requested set of data from said data source.

20. The system of claim 18, wherein said middleware program is further configured to copy less than all of said set of data into said cache data table if the total size of said set of data exceeds a system-allowed maximum cache size.

21. The system of claim 18, wherein said middleware program is further configured to return only a specified portion of said cached set of data based on information included in the request from said application program.

22. The system of claim 16, wherein, in response to said request from said application program to cache said specific set of data, said middleware program is configured to
add cache control information data to said cache control information table.

23. The system of claim 15, further comprising a cache maintenance program embodied in a computer readable medium and communicatively coupled to the cache database, the cache maintenance program configured to maintain said cache database; wherein said cache maintenance program is configured to remove an oldest one or more of said cached sets of data from said cache database when there is not enough storage space in the cache database to accommodate a new cache request.

24. The system of claim 15, wherein said middleware program is configured to:
use the unique identifier in said subsequent request to determine whether said cached set of data still exists in the cache database maintained on said database server; and
recreate a cache of said set of data in said cache database if it is determined that said set of data does not still exist in said cache database.

25. The system of claim 15, wherein the application program making said subsequent request is a different application program than the application program responsible for creating said cached set of data.

26. The system of claim 15, wherein said middleware program is configured to perform additional sorting of data included in said cached set of data, in response to said subsequent request.

27. A computer-readable medium storing instructions that, when presented to a processor, cause the processor to perform the steps of:
receiving an initial request from a first application program to cache a specific set of data;
accessing a data source that contains the requested set of data;
creating a cache of the set of data in a cache database maintained on a database server, the cached set of data including a plurality of records;
assigning a unique identifier to the cached set of data for identifying said cached set of data during subsequent calls;
returning the unique identifier and a first portion of the cached set of data to the first application program making said initial request;
receiving a subsequent request from a second application program to retrieve a second portion of said cached set of data, wherein said subsequent request comprises the unique identifier that identifies said cached set of data and a request to sort or filter the plurality of records in the cached set of data;
using the unique identifier in said subsequent request to determine whether said cached set of data still exists in the cache database maintained on said database server;
recreating a cache of the set of data in said cache database if it is determined that said cached set of data does not still exist in the cache database;
sorting the plurality of records in the cached set of data in accordance with the request to sort the plurality of records in the cached set of data to define the second portion of the cached set of data; and
returning the second portion of said cached set of data to said second application program.

28. A method comprising:
receiving a cache request from an application program to cache a specific set of data;
accessing a data source that contains the specific set of data;
generating a structured query language (SQL) statement to be used to retrieve the specific set of data from the data source;
assigning a unique identifier to the cache request;
adding a unique record associated with the cache request to a cache control information table, wherein the unique record includes the unique identifier assigned to the cache request and the SQL statement configured to identify the specific set of data associated with the cache request;

returning the unique identifier and a first portion of the set of data to the application program making said request;

receiving a subsequent request from an application program to retrieve a second portion of the set of data, wherein the subsequent request comprises the unique identifier;

using the unique identifier in the subsequent request to identify the unique record; and modifying said SQL statement to produce a modified SQL statement, the modified SQL statement being configured to retrieve the second portion of the set of data from the data source.

* * * * *